(12) United States Patent
Pogorelik

(10) Patent No.: US 12,155,695 B2
(45) Date of Patent: Nov. 26, 2024

(54) EXECUTING SECURITY NEGOTIATION FOR NETWORK CONFIGURATION

(71) Applicant: Huawei Technologies Co., Ltd., Shenzhen (CN)

(72) Inventor: Oleg Pogorelik, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 17/843,670

(22) Filed: Jun. 17, 2022

(65) Prior Publication Data

US 2022/0321608 A1    Oct. 6, 2022

Related U.S. Application Data

(63) Continuation of application No. PCT/EP2019/085893, filed on Dec. 18, 2019.

(51) Int. Cl.
H04L 9/40     (2022.01)

(52) U.S. Cl.
CPC .................................. H04L 63/205 (2013.01)

(58) Field of Classification Search
CPC ... H04L 63/205; H04L 41/0894; H04L 41/28; H04L 63/102; H04W 12/60
See application file for complete search history.

(56) References Cited

U.S. PATENT DOCUMENTS

| 6,754,832 B1* | 6/2004 | Godwin | H04L 63/0227 726/4 |
| 7,373,654 B1* | 5/2008 | Reid | H04L 63/20 726/1 |
| 7,577,837 B1* | 8/2009 | Ithal | H04L 63/104 709/225 |
| 8,478,675 B1* | 7/2013 | Walia | G06Q 40/06 705/37 |

(Continued)

FOREIGN PATENT DOCUMENTS

| EP | 2779531 A2 | 9/2014 |
| KR | 100989082 B1 | 10/2010 |

(Continued)

OTHER PUBLICATIONS

Rhand Leal, "How to implement network segregation according to ISO 27001 control A.13.1.3," https://advisera.com/27001academy/blog/2015/11/02/requirements-to-implement-network-segregation-according-to-iso-27001-control-a-13-1-3/, Total 7 Pages (Nov. 2, 2015).

*Primary Examiner* — Aravind K Moorthy
(74) *Attorney, Agent, or Firm* — Leydig, Voit & Mayer, Ltd.

(57) ABSTRACT

A method for executing a security negotiation for a network configuration at a network device, includes obtaining, by the network device, a security update information from a communication device being assigned to a first security segment. The first security segment is associated with a first segment security profile. The security update information is indica- (Continued)

OBTAIN SECURITY UPDATE INFORMATION FROM COMMUNICATION DEVICE BEING ASSIGNED TO FIRST SECURITY SEGMENT
102

DETERMINE SECOND SECURITY SEGMENT FOR COMMUNICATION DEVICE BASED ON SECURITY UPDATE INFORMATION
104

PROVIDE INSTRUCTION TO COMMUNICATION DEVICE TO JOIN DETERMINED SECOND SECURITY SEGMENT
106 tive of at least one change in a first security profile of the communication device. The method further includes determining, by the network device, a second security segment for the communication device based on the security update information. An instruction is provided by the network device to the communication device to join the determined second security segment.

19 Claims, 7 Drawing Sheets

(56) References Cited

U.S. PATENT DOCUMENTS

| | | | |
|---|---|---|---|
| 8,479,266 B1 | 7/2013 | Delker et al. | |
| 8,726,348 B2* | 5/2014 | Patel | H04L 63/102 726/3 |
| 8,973,088 B1* | 3/2015 | Leung | H04L 63/1408 726/1 |
| 9,258,313 B1* | 2/2016 | Knappe | H04L 63/0236 |
| 9,584,964 B2* | 2/2017 | Pelkey | H04W 12/065 |
| 9,692,640 B1* | 6/2017 | Veladanda | H04L 41/0803 |
| 9,819,699 B1* | 11/2017 | Nenov | H04L 67/60 |
| 10,069,799 B2* | 9/2018 | Baliga | H04L 63/1458 |
| 10,104,128 B2* | 10/2018 | Jacobsen | H04W 12/128 |
| 10,565,372 B1* | 2/2020 | Stickle | G06F 21/55 |
| 10,607,015 B1* | 3/2020 | Hecht | G06F 9/54 |
| 10,705,945 B1* | 7/2020 | Stickle | G06F 9/5061 |
| 10,771,506 B1* | 9/2020 | Kumar | H04L 63/02 |
| 10,966,096 B1* | 3/2021 | Mhaske | H04L 63/205 |
| 10,972,508 B1* | 4/2021 | Dods | H04L 63/1433 |
| 10,986,122 B2* | 4/2021 | Bloxham | H04L 63/10 |
| 11,063,758 B1* | 7/2021 | Amdahl | H04L 9/14 |
| 11,089,109 B1* | 8/2021 | Bertz | H04W 12/02 |
| 11,184,404 B1* | 11/2021 | Hatch | H04L 63/205 |
| 11,310,283 B1* | 4/2022 | Hatch | H04L 63/205 |
| 11,316,667 B1* | 4/2022 | Katti | H04L 63/062 |
| 11,363,072 B1* | 6/2022 | Relan | G06F 9/451 |
| 11,570,148 B2* | 1/2023 | Liu | H04L 67/10 |
| 2002/0066036 A1* | 5/2002 | Makineni | H04W 8/04 726/13 |
| 2004/0003265 A1* | 1/2004 | Freeman | G06F 21/572 713/191 |
| 2004/0088537 A1* | 5/2004 | Swander | H04L 63/0464 380/278 |
| 2005/0149732 A1* | 7/2005 | Freeman | H04L 67/02 713/171 |
| 2006/0143179 A1* | 6/2006 | Draluk | H04L 63/20 707/999.009 |
| 2006/0182280 A1* | 8/2006 | Laitinen | H04L 63/166 380/247 |
| 2007/0002768 A1* | 1/2007 | Nandy | H04L 63/164 370/255 |
| 2007/0157286 A1* | 7/2007 | Singh | H04L 63/20 726/1 |
| 2007/0192848 A1* | 8/2007 | Jong | H04L 61/00 726/14 |
| 2007/0288989 A1* | 12/2007 | Aarnos | G06F 21/53 726/1 |
| 2008/0046755 A1* | 2/2008 | Hayes | H04L 9/3268 713/187 |
| 2008/0104693 A1* | 5/2008 | McAlister | H04L 61/2578 713/150 |
| 2010/0080177 A1* | 4/2010 | Rofougaran | H04W 76/15 370/329 |
| 2011/0113236 A1* | 5/2011 | Chenard | H04L 63/0485 713/154 |
| 2011/0154035 A1* | 6/2011 | Yao | H04L 9/321 713/168 |
| 2011/0202756 A1* | 8/2011 | West | H04L 63/0428 713/152 |
| 2012/0011559 A1* | 1/2012 | Miettinen | G06F 21/31 726/1 |
| 2013/0247134 A1* | 9/2013 | Puttaswamy Naga | H04L 63/0218 726/1 |
| 2013/0254831 A1* | 9/2013 | Roach | H04W 12/082 726/1 |
| 2013/0275574 A1* | 10/2013 | Hugard, IV | H04L 63/10 709/224 |
| 2014/0115702 A1* | 4/2014 | Li | H04L 63/0464 726/23 |
| 2014/0123211 A1 | 5/2014 | Wanser et al. | |
| 2014/0189777 A1* | 7/2014 | Viswanathan | H04L 63/105 726/1 |
| 2014/0282860 A1* | 9/2014 | Efrati | H04W 12/37 726/1 |
| 2014/0304766 A1* | 10/2014 | Livne | H04L 63/1433 726/1 |
| 2014/0359780 A1* | 12/2014 | Zandani | H04L 63/1433 726/25 |
| 2015/0101012 A1* | 4/2015 | White | H04L 63/20 726/1 |
| 2015/0229593 A1* | 8/2015 | Parker | H03M 7/00 709/206 |
| 2015/0244742 A1* | 8/2015 | Reynolds | H04L 63/205 726/1 |
| 2015/0334116 A1* | 11/2015 | Martini | H04L 61/4511 726/1 |
| 2016/0127691 A1* | 5/2016 | Bokowski | G08B 13/19656 348/159 |
| 2016/0183164 A1* | 6/2016 | Pelkey | H04W 48/04 455/456.1 |
| 2016/0212166 A1* | 7/2016 | Henry | G06F 21/604 |
| 2016/0212167 A1* | 7/2016 | Dotan | G06F 3/04847 |
| 2016/0212169 A1* | 7/2016 | Knjazihhin | H04L 63/20 |
| 2016/0219077 A1* | 7/2016 | Pandya | H04L 41/0893 |
| 2016/0344743 A1* | 11/2016 | Dotan | G06F 16/9535 |
| 2016/0357968 A1* | 12/2016 | Lam | G06F 9/45533 |
| 2016/0359906 A1* | 12/2016 | Lam | G06F 21/629 |
| 2017/0142094 A1* | 5/2017 | Doitch | G06F 21/41 |
| 2017/0171170 A1* | 6/2017 | Sun | H04L 9/088 |
| 2017/0208101 A1* | 7/2017 | Lin | G06F 21/45 |
| 2017/0329966 A1* | 11/2017 | Koganti | G06F 21/56 |
| 2018/0013798 A1* | 1/2018 | Pallas | H04L 12/4641 |
| 2018/0063195 A1* | 3/2018 | Nimmagadda | H04L 63/0263 |
| 2018/0115579 A1* | 4/2018 | Schieman | H04L 63/1433 |
| 2018/0212768 A1* | 7/2018 | Kawashima | H04L 63/0876 |
| 2018/0225106 A1* | 8/2018 | Lo | G06F 8/654 |
| 2018/0234455 A1* | 8/2018 | Hocker | H04L 67/34 |
| 2018/0268149 A1* | 9/2018 | Deras Arreola | H04W 12/06 |
| 2018/0270200 A1* | 9/2018 | Byrne | H04L 63/0263 |
| 2019/0081862 A1* | 3/2019 | Lockhart | H04L 41/0889 |
| 2019/0281052 A1* | 9/2019 | Lekkas | H04L 9/14 |
| 2019/0327260 A1* | 10/2019 | Adamson | H04L 43/065 |
| 2019/0394211 A1* | 12/2019 | Filsfils | H04L 45/7453 |
| 2020/0007311 A1* | 1/2020 | Oberhofer | H04L 63/102 |
| 2020/0045079 A1* | 2/2020 | Dods | H04L 63/101 |
| 2020/0089892 A1* | 3/2020 | Ojha | H04L 63/1466 |
| 2020/0159950 A1* | 5/2020 | Bodin | G06F 11/3466 |
| 2020/0162517 A1* | 5/2020 | Wong | H04L 63/0236 |
| 2020/0169528 A1* | 5/2020 | Le | H04W 4/70 |
| 2020/0177485 A1* | 6/2020 | Shurtleff | H04L 41/142 |
| 2020/0186538 A1* | 6/2020 | Koshal | H04L 61/2557 |
| 2020/0195693 A1* | 6/2020 | Price | G06F 21/552 |
| 2020/0336513 A1* | 10/2020 | Martin | H04L 63/0263 |
| 2020/0389472 A1* | 12/2020 | Drapeau | H04L 63/1416 |
| 2021/0029173 A1* | 1/2021 | Deb | G06Q 10/0635 |
| 2021/0029174 A1* | 1/2021 | Kunduru | H04L 63/20 |
| 2021/0158675 A1* | 5/2021 | Burris | H04W 4/023 |
| 2021/0185051 A1* | 6/2021 | Soryal | G06F 21/6218 |

FOREIGN PATENT DOCUMENTS

| | | |
|---|---|---|
| WO | 2004021114 A2 | 3/2004 |
| WO | 2014194742 A1 | 12/2014 |
| WO | 2016132181 A1 | 8/2016 |
| WO | 2019231923 A1 | 12/2019 |

* cited by examiner

EXECUTING SECURITY NEGOTIATION FOR NETWORK CONFIGURATION

CROSS-REFERENCE TO RELATED APPLICATIONS

This application is a continuation of International Application No. PCT/EP2019/085893, filed on Dec. 18 2019, the disclosure of which is hereby incorporated by reference in its entirety.

TECHNICAL FIELD

The present disclosure relates generally to the field of network management and security; and more specifically, to methods and devices for executing a security negotiation for a network configuration.

BACKGROUND

With the rapid growth of network infrastructure, concerns about network management and security have become prominent. Currently, network segmentation is widely used to manage risks of security breaches. Typically, network segments are sections of a network separated from other segments by using a conventional network device (e.g. a gateway device, a router, and the like). Various communication devices (e.g. laptops, IoT devices, smartphones, servers, and the like) are usually selectively grouped into different network segments to manage risks of security breaches in the communication devices connected to the network as well as the network infrastructure. In conventional methods and systems, decisions regarding network segment association are taken based on an assumption that the conventional network device is aware and in control of all network related functions and activities. Thus, the decisions regarding network segment association are taken entirely by the network device, which is not desirable. For example, the conventional network device may fail to assign a given network segment (or assign an inappropriate network segment) to a given communication device, which is unknown (e.g. an unsupported device type) and demonstrates unpredictable network behaviour. The failure to assign any given network segment or assignment of the inappropriate network segment (i.e. a segment mismatch) may pose a security risk. In another example, a communication device (e.g. an IoT controller) may communicate with peer communication devices (e.g. other IoT devices) and a cloud server through an alternate network (e.g. a cellular network) bypassing a regular communication channel (e.g. a Wi-Fi network) with a conventional network device. Thus, such communication via the alternate network may be unavailable (i.e. invisible) to the conventional network device via the regular communication channel. In such cases, the conventional network device may not be aware of all network related functions and activities, and thus may not be able to perform adequate network configuration, resulting in a compromise in the network security (i.e. a security gap). Alternatively stated, in such cases, dynamic network configuration and association of a network segment to a conventional communication device by a conventional network device may encounter many technical challenges, such as network segment mismatches and inadequate security. Moreover, in such cases, the conventional communication devices may not work properly and may require heavy manual labour at the conventional network device for network management and configuration.

Therefore, in light of the foregoing discussion, there exists a need to overcome the aforementioned drawbacks associated with conventional methods, systems, and devices for network management and security.

SUMMARY

The present disclosure seeks to provide methods, devices, and computer program products for executing a security negotiation for a network configuration. The present disclosure seeks to provide a solution to the existing problem of inefficient network management and inadequate network security as a result of decisions regarding network segment association taken entirely by a conventional network device. An aim of the present disclosure is to provide a solution that overcomes at least partially the problems encountered in prior art, and provides improved methods and devices that enables efficient network management and provides adequate network security.

The object of the present disclosure is achieved by the solutions provided in the enclosed independent claims. Advantageous implementations of the present disclosure are further defined in the dependent claims.

In a first aspect, the present disclosure provides a method for executing a security negotiation for a network configuration at a network device. The method comprises obtaining, by the network device, a security update information from a communication device being assigned to a first security segment. The first security segment being associated with a first segment security profile. The security update information is indicative of at least one change in a first security profile of the communication device. The method further comprises determining, by the network device, a second security segment for the communication device based on the security update information. The method further comprises providing, by the network device, an instruction to the communication device to join the determined second security segment.

The method of the first aspect enables the network device to determine an appropriate security segment (i.e. a correct network segment) from a plurality of security segments that fulfils the latest change in the first security profile of the communication device. As the security update information obtained from the communication device is used in the determination of the second security segment by the network device, chances of security segment mismatch are significantly reduced, thereby reducing the risk of security breaches in the communication device and improving overall network security. Moreover, as the chances of security segment mismatch are significantly reduced, manual labour for network management and configuration is not required or at least reduced, thereby improving efficiency in network management.

In a first implementation form of the first aspect, the method further comprises providing, by the network device, to the communication device, a second segment security profile associated with the determined second security segment. The second segment security profile is used by the communication device to: validate a decision to join the second security segment; and control, based on the validation, enablement and disablement of one or more functions or services at the communication device in accordance with the second segment security profile.

The second segment security profile shared with the communication device enables the communication device to validate the decision whether to join the second security segment or not, and thus an active participation of the communication device is ensured in the decisions regarding association with the determined second security segment. In cases where the validation is successful, certain functions or services at the communication device which have become incompatible as a result of the change in the first security profile of the communication device, are enabled or disabled (e.g. insecure functions may be disabled) in accordance with the second segment security profile.

In a second implementation form of the first aspect, the obtaining of the security update information by the network device is based on a change in a device operational state of the communication device or a change in a network environment of the communication device.

The change in the device operational state or the network environment of the communication device dynamically changes the first security profile of the communication device. Thus, obtaining of the security update information that indicates such change(s) enables the network device to quickly close security gaps that may potentially arise due to such changes at the communication device.

In a third implementation form of the first aspect, the determining of the second security segment for the communication device comprises comparing security attributes associated with the indicated at least one change in the first security profile with corresponding security attributes associated with each of a plurality of segment security profiles associated with a plurality of security segments.

The comparison of the security attributes ensures that a security segment that best matches with the indicated change among the plurality of security segments is determined for the communication device.

In a fourth implementation form of the first aspect, the method further comprises applying a specific network policy associated with the second security segment for the communication device after the communication device joins the second security segment and leaves the first security segment.

The application of the specific network policy associated with the second security segment provides an adequate network security and ensures that an access is granted to one or more new services required by the communication device as a result of the at least one change in the first security profile of the communication device after the communication device joins the second security segment and leaves the first security segment. Similarly, certain services which are no longer required are disabled (e.g. access revoked) to minimize or at least reduce the risk of security breaches in the communication device connected to a network (e.g. the Internet) via the network device.

In a fifth implementation form of the first aspect, the first security profile comprises one or more of: device properties, a device operational state, a network environment of the communication device, or a request to access one or more services at the communication device. The first security profile is updated by the communication device to a second security profile based on at least a change in a device operational state of the communication device or a change in a network environment of the communication device.

The first security profile of the communication device is dynamic and not static, and thus any change in the device operational state or any change in the network environment in which the communication device operates, can be accommodated in the first security profile. Thus, in contradiction to conventional systems and methods, the method enables to support scenarios where a device security profile (i.e. content of the first security profile of the communication device) change suddenly as a result of the change in the device operational state or the change in the network environment of the communication device.

In a sixth implementation form of the first aspect, the security update information corresponds to at least one of: the second security profile or one or more differences between the second security profile and the first security profile. The second security profile comprises one or more of: up-to-date device properties, a current device operational state, a last device operational state, an alternative network connectivity path used by the communication device, a request to access one or more services that are different from services supported in the first security segment assigned to the communication device, or a security event that defines dynamically changing information associated with the communication device.

The security update information enables the network device to be aware of any changes in network related functions and activities even if any network related communication bypasses a regular communication channel with the network device. Thus, the method enables to quickly and adequately close security gaps that may potentially arise due to such update or changes in the first security profile (i.e. security requirements) of the communication device.

In a seventh implementation form of the first aspect, the determining of the second security segment for the communication device comprises using a message type indicator and the second security profile.

By taking into account the message type indicator and the second security profile, an accuracy in the determination of the second security segment for the communication device is increased, thereby improving efficiency in network management and reducing the risk of security.

In eight implementation form of the first aspect, the communication device is assigned to the first security segment based on a first-time joining operation between the network device and the communication device. The first-time joining operation comprises obtaining, by the network device, the first security profile from the communication device over a negotiation segment when the communication device is in an unassigned state to a given security segment. The first security profile is indicative of device capabilities and security requirements of the communication device in the unassigned state. The first-time joining operation further comprises determining, by the network device, the first security segment from a plurality of security segments for assignment to the communication device based on the obtained first security profile. The first-time joining operation further comprises providing, by the network device, an instruction to the communication device to join the first security segment, wherein the instruction apprises the communication device of the determined first security segment that is relevant to the device capabilities and the security requirements of the communication device.

The first security profile enables enhanced assessment of the security capabilities and security requirements of the communication device by the network device. For example, certain security features (or security posture) of the communication device that may otherwise remain undetected (i.e. unexposed) via a regular communication channel (e.g. using auto-discoverable function) by the network device, is easily and accurately detected by use of the first security profile. Thus, the first security profile enables the network device to determine a best matching security segment (i.e. the first security segment in this case) from among the plurality of security segments for assignment to the communication device, thereby providing adequate security.

In a second aspect, the present disclosure provides a method for executing a security negotiation for a network configuration at a communication device. The method comprises providing, by the communication device, a security update information to a network device. The communication device being assigned to a first security segment associated with a first segment security profile. The security update information is indicative of at least one change in a first security profile of the communication device. The method further comprises obtaining, by the communication device, an instruction from the network device to join a second security segment. The method further comprises joining, by the communication device, the second security segment that meets the indicated at least one change in the first security profile of the communication device, based on the obtained instruction.

The method enables active participation of the communication device along with the network device in the decisions regarding association with a security segment (e.g. the determined second security segment in this case). As the security update information is proactively shared by the communication device, the network device is able to determine a correct security segment (i.e. the second security segment in this case) from a plurality of security segments that fulfils the latest change in the first security profile of the communication device. Thus, the chances of security segment mismatch are significantly reduced, thereby reducing the risk of security breaches in the communication device and improving overall network security and efficiency in network management. The joining of the second security segment by the communication device enables to quickly and adequately close security gaps that may potentially arise due to such update or changes (e.g. changes in certain security attributes, services, or features) in the first security profile of the communication device.

In a first implementation form of the second aspect, the security update information is provided by the communication device to the network device based on a change in a device operational state of the communication device or a change in a network environment of the communication device.

The security update information that indicates such change(s) is proactively provided by the communication device to the network device so that the network device is able to quickly close security gaps that may potentially arise due to such changes at the communication device.

In a second implementation form of the second aspect, the first security profile comprises one or more of: device properties, a device operational state, a network environment of the communication device, or a request to access one or more services at the communication device.

The first security profile is comprehensive and adequately specifies device capabilities and security requirements of the communication device. For example, a device type, uniform resource locator (URL) access list, supported protocols, open or closed ports, requirements to access certain network resources or services or disable certain other services, download or upload permissions, and the like, are specified in the first security profile. Thus, the security update information that indicates at least one change (e.g. any change in the device properties, a network environment, change in requirement to access new services or disable currently accessed services) of the first security profile, enables the network device to determine a best matching segment from a plurality of security segments to satisfy the latest change in the first security profile of the communication device.

In a third implementation form of the second aspect, the method further comprises updating, by the communication device, the first security profile to a second security profile based on at least a change in a device operational state of the communication device or a change in a network environment of the communication device.

The first security profile of the communication device is dynamic and not static, and thus any change in the device operational state or any change in the network environment in which the communication device operates, can be accommodated in the first security profile. The update of the first security profile to the second security profile enables to record most recent information related to device properties, any change in the device operational state, or any change in the network environment of the communication device.

In a fourth implementation form of the second aspect, the security update information corresponds to at least one of: the second security profile or one or more differences between the second security profile and the first security profile, and wherein the second security profile comprises one or more of: up-to-date device properties, a current device operational state, a last device operational state, an alternative network connectivity path used by the communication device, a request to access one or more services that are different from services supported by the first security segment, or a security event that defines dynamically changing information associated with the communication device, and wherein a message type indicator and the second security profile is used by the network device to determine the second security segment.

The security update information enables the network device to be aware of any changes in network related functions and activities of the communication device even if any network related communication bypasses a regular communication channel with the network device. Thus, the method enables to quickly and adequately close security gaps that may potentially arise due to such update or changes related to security requirements of the communication device.

In a fourth implementation form of the second aspect, the joining of the second security segment comprises obtaining, by the communication device, from the network device, one or more of: a list of security services supported by the network device for the second security segment, a second segment security profile associated with the second security segment, or a plurality of segment security profiles for a plurality of security segments available with the network device.

The obtaining of such information (such as the list of security services, the second segment security profile, and other available segment security profiles) enables security negotiation and mutual security validation between the communication device and the network device. Alternative stated, both the network device and the communication device may execute security negotiation to allow both a first-time network confirmation and on-demand network configuration (or re-configuration), where one party (e.g. the network device) specifies a list of available options to allow counterparty (e.g. the communication device) selection of a best matching option (i.e. a correct security segment), thereby reducing security segment mismatches, and improving overall network security and efficiency in network management.

In a fifth implementation form of the second aspect, the method further comprises validating, by the communication device, a decision related to the joining of the second security segment based on an assessment of the obtained second segment security profile associated with the second security segment. The method further comprises controlling, by the communication device, enablement and disablement of one or more functions or services at the communication device in accordance with the obtained second segment security profile associated with the second security segment, if the validation is successful.

The method provides an opportunity to the communication device to assess the obtained second segment security profile associated with the second security segment, in order to decide whether the second security segment meets the change in the first security profile (e.g. a change as a result of internal firewall failure at the communication device). This enables active participation of the communication device along with the network device in the decisions regarding association with a security segment (e.g. the determined second security segment in this case).

In a sixth implementation form of the second aspect, the communication device is assigned to the first security segment based on a first-time joining operation between the communication device and the network device. The first-time joining operation comprises providing, by the communication device, the first security profile to the network device over a negotiation segment when the communication device is in an unassigned state to a given security segment. The first security profile is indicative of device capabilities and security requirements of the communication device in the unassigned state. The first-time joining operation further comprises obtaining, by the communication device, an instruction from the network device to join the first security segment. The first-time joining operation further comprises joining, by the communication device, the first security segment based on the obtained instruction.

In a case where the communication device is not yet assigned to any security segment (i.e. the unassigned state), the first-time joining operation enables the network device to determine, based on the first security profile, a best matching security segment (i.e. the first security segment) from among the plurality of security segments for assignment to the communication device, thereby providing adequate security. For example, certain security features (or security posture) of the communication device that may otherwise remain undetected (i.e. unexposed) via a regular communication channel (e.g. using auto-discoverable function) between the communication device and the network device, are easily and accurately detected using the first security profile.

In a third aspect, the present disclosure provides a network device for executing a security negotiation for a network configuration. The network device comprises a control circuitry that is configured to obtain security update information from a communication device being assigned to a first security segment. The first security segment being associated with a first segment security profile. The security update information is indicative of at least one change in a first security profile of the communication device. The control circuitry is further configured to determine a second security segment for the communication device based on the security update information. The control circuitry is further configured to provide an instruction to the communication device to join the determined second security segment.

In further implementation forms of the network device of the third aspect, the control circuitry is configured to perform the features of the implementation forms of the method according to the first aspect. Hence, implementation forms of the network device comprise the feature(s) of the corresponding implementation form of the method of the first aspect.

The network device of the third aspect achieves all the advantages and effects of the method of the first aspect.

In a fourth aspect, the present disclosure provides a communication device for executing a security negotiation for a network configuration. The communication device comprises a control circuitry that is configured to provide a security update information to a network device from the communication device being assigned to a first security segment. The first security segment being associated with a first segment security profile. The security update information is indicative of at least one change in a first security profile of the communication device. The control circuitry is further configured to obtain an instruction from the network device to join a second security segment. The control circuitry is further configured to join the second security segment that meets the indicated at least one change in the first security profile of the communication device, based on the obtained instruction.

In further implementation forms of the communication device of the fourth aspect, the control circuitry is configured to perform the features of the implementation forms of the method according to the second aspect. Hence, implementation forms of the communication device comprise the feature(s) of the corresponding implementation form of the method of the second aspect.

The communication device of the fourth aspect achieves all the advantages and effects of the method of the second aspect.

In a fifth aspect, the present disclosure provides a computer program product that comprises a non-transitory computer-readable storage medium having computer-readable instructions stored thereon, the computer-readable instructions being executable by a computerised device comprising processing hardware to execute the aforementioned method of the first aspect or the second aspect.

The computer program product of the fifth aspect achieves all the advantages and effects of the method of the first aspect or the second aspect.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
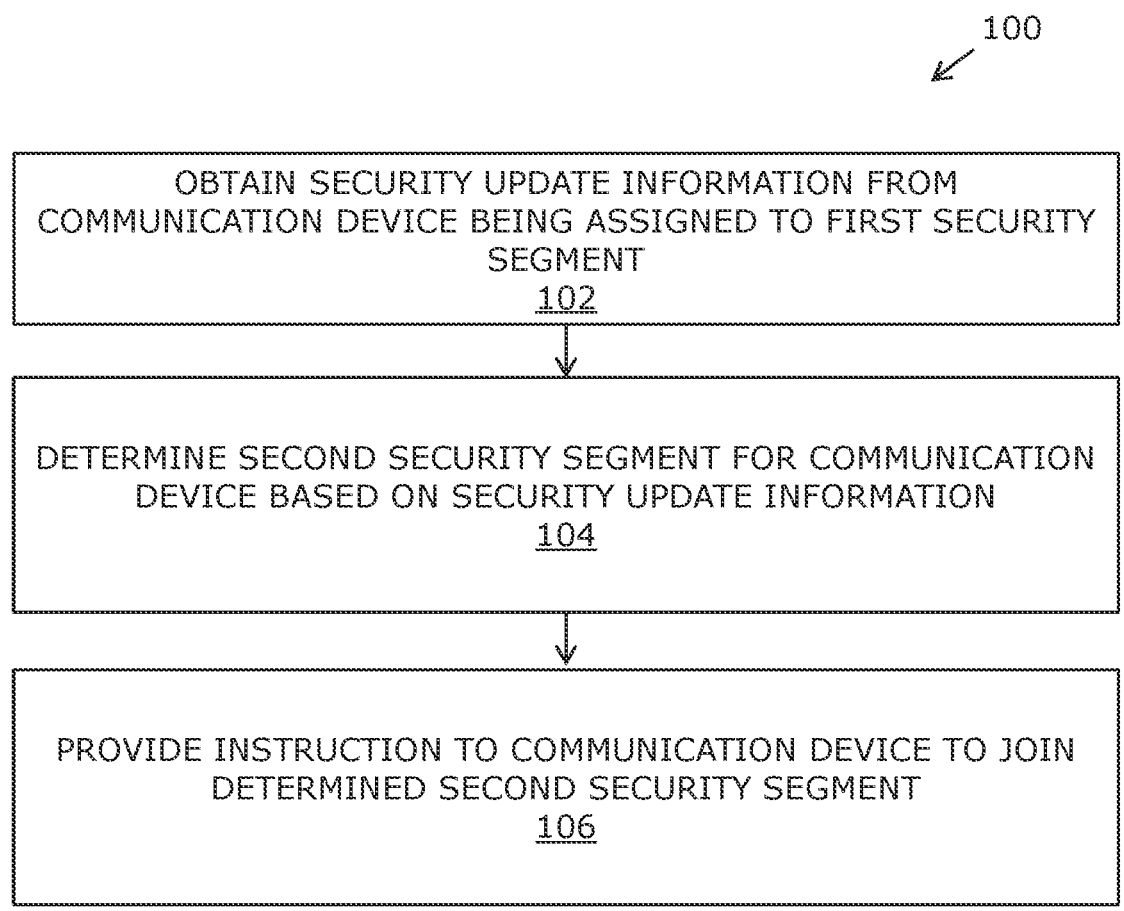
FIG. 1 is a flowchart of a method for executing a security negotiation for a network configuration at a network device, in accordance with an embodiment of the present disclosure.

FIG. 1 is a flowchart of a method 100 for executing a security negotiation for a network configuration at a network device, in accordance with an embodiment of the present disclosure. The method 100 is executed by a network device described, for example, in FIG. 3A. The method 100 includes steps 102, 104, and 106.

At step 102, a security update information is obtained by the network device from a communication device being assigned to a first security segment. The first security segment is associated with a first segment security profile. In an example, the first security segment may also be referred to as a network segment (i.e. one of the many network segments initially assigned to the communication device). The security update information is indicative of at least one change in a first security profile (e.g. a device security profile) of the communication device. For example, the first security profile of the communication device may be changed as a result of an internal firewall application failure at the communication device. In an example, the security update information is obtained by the network device based on an on-demand request from the communication device (i.e. the communication device originated request) for segment reallocation from the currently assigned first security segment to a new security segment. Examples of the communication device, the network device, and various security profiles and segments are further described in details, for example, in FIG. 3A and FIG. 5.

In accordance with an embodiment, the first security profile comprises one or more of device properties, a device operational state, a network environment of the communication device, or a request to access one or more services at the communication device. The first security profile is updated by the communication device to a second security profile based on at least a change in a device operational state of the communication device or a change in a network environment of the communication device. Examples of the device properties include, but are not limited to a device type, a manufacturer name, a current access list of uniform resource locators (URLs), a list of protocols (e.g. IPV4 or IPV6) supported at the communication device, a list of open ports, a list of closed ports, a list of allowed control interfaces, content type to and from the communication device, a security posture of the communication device, and the like. In an example, the device operational state specifies an application state or a hardware state of the communication device when in operation. The network environment of the communication device includes information related to current network connectivity path(s) used by the communication device. In an example, whether the data traffic to and from the communication device is routed via the network device or not is potentially specified in (or inferred from) the first security profile. In contrast to conventional systems and methods, the first security profile of the communication device is dynamic (and not static), which can accommodate such change(s) as a result of the change in the device operational state or the network environment of the communication device.

In accordance with an embodiment, the security update information corresponds to at least one of: the second security profile or one or more differences between the second security profile and the first security profile. In an implementation, the entire second security profile is provided to the network device. In other words, the second security profile is exposed (e.g. advertised or published) so that the network device can obtain the second security profile. In another implementation, optionally, only the latest changes or updates (i.e. the one or more differences between the second security profile and the first security profile) are provided as the security update information to the network device in order to save network bandwidth, and improve network performance. The second security profile comprises one or more of: up-to-date device properties, a current device operational state, a last device operational state, an alternative network connectivity path used by the communication device, a request to access one or more services that are different from services supported in the first security segment assigned to the communication device, or a security event that defines dynamically changing information associated with the communication device. In the conventional systems and methods, such changes related to security requirements at the communication device are not immediately reflected by network communication patterns, and thus a conventional network device is not aware of such changes. In contrast to conventional systems and methods, such changes are discernible from the obtained security update information, thereby reducing a risk of security breaches in the communication device and improving overall network security and efficiency in network management.

In accordance with an embodiment, the communication device is assigned to the first security segment based on a first-time joining operation between the network device and the communication device. The first-time joining operation comprises obtaining, by the network device, the first security profile from the communication device over a negotiation segment when the communication device is in an unassigned state to a given security segment. In an example, the negotiation segment may refer to a network segment that supports security negotiation and is temporarily used by the network device and the communication device to communicate prior to an actual assignment (or allocation) of a given security segment of a plurality of security segments. The first security profile is indicative of device capabilities and security requirements of the communication device in the unassigned state. The first-time joining operation further comprises determining, by the network device, the first security segment from the plurality of security segments for assignment to the communication device based on the obtained first security profile. The first-time joining operation further comprises providing, by the network device, an instruction to the communication device to join the first security segment. The instruction apprises the communication device of the determined first security segment that is relevant to the device capabilities and the security requirements of the communication device.

At step 104, a second security segment is determined by the network device for the communication device based on the security update information. The determined second security segment is the one that meets the indicated at least one change in the first security profile of the communication device. In accordance with an embodiment, the determining of the second security segment for the communication device comprises comparing security attributes associated with the indicated at least one change in the first security profile with corresponding security attributes associated with each of a plurality of segment security profiles associated with the plurality of security segments. The comparison is executed to find a best matching segment (i.e. the second security segment in this case) for the communication device from among the plurality of security segments for the communication device.

In accordance with an embodiment, the determining of the second security segment for the communication device comprises using a message type indicator and the second security profile. In an example, the message type indicator may indicate the on-demand request for segment reallocation.

At step 106, an instruction is provided by the network device to the communication device to join the determined second security segment. Alternatively stated, the network device provides a directive to the communication device to attach (i.e. enable joining of) the communication device to appropriate security segment.

In accordance with an embodiment, the method 100 further comprises providing, by the network device, to the communication device, a second segment security profile associated with the determined second security segment. The second segment security profile is used by the communication device to validate a decision to join the second security segment. The communication device joins the second security segment if the validation is successful (i.e. the communication device and the network device mutually agree that the second security segment is a best match in accordance to the security update information). The second segment security profile is further used by the communication device to control, based on the validation, enablement and disablement of one or more functions or services at the communication device in accordance with the second segment security profile. In other words, in cases where the validation is successful, certain functions or services at the communication device (which have become incompatible as a result of the change in the first security profile of the communication device) are enabled or disabled (e.g. insecure functions may be disabled) in accordance with the second segment security profile.

In accordance with an embodiment, the method 100 further comprises applying a specific network policy associated with the second security segment for the communication device after the communication device joins the second security segment and leaves the first security segment. In an example, the network device may include a function of policy manager that manages different network policies associated with different security segments. A specific security segment has a specific network policy associated therewith. After the security negotiation is executed, and the communication device joins the determined second security segment, the specific network policy related to the second security segment is applied in order to proactively fulfil a potential security gap that may arise as a result of the latest change in the first security profile of the communication device.

The steps 102, 104, and 106 are only illustrative and other alternatives can also be provided where one or more steps are added, one or more steps are removed, or one or more steps are provided in a different sequence without departing from the scope of the claims herein.

Figure 2:
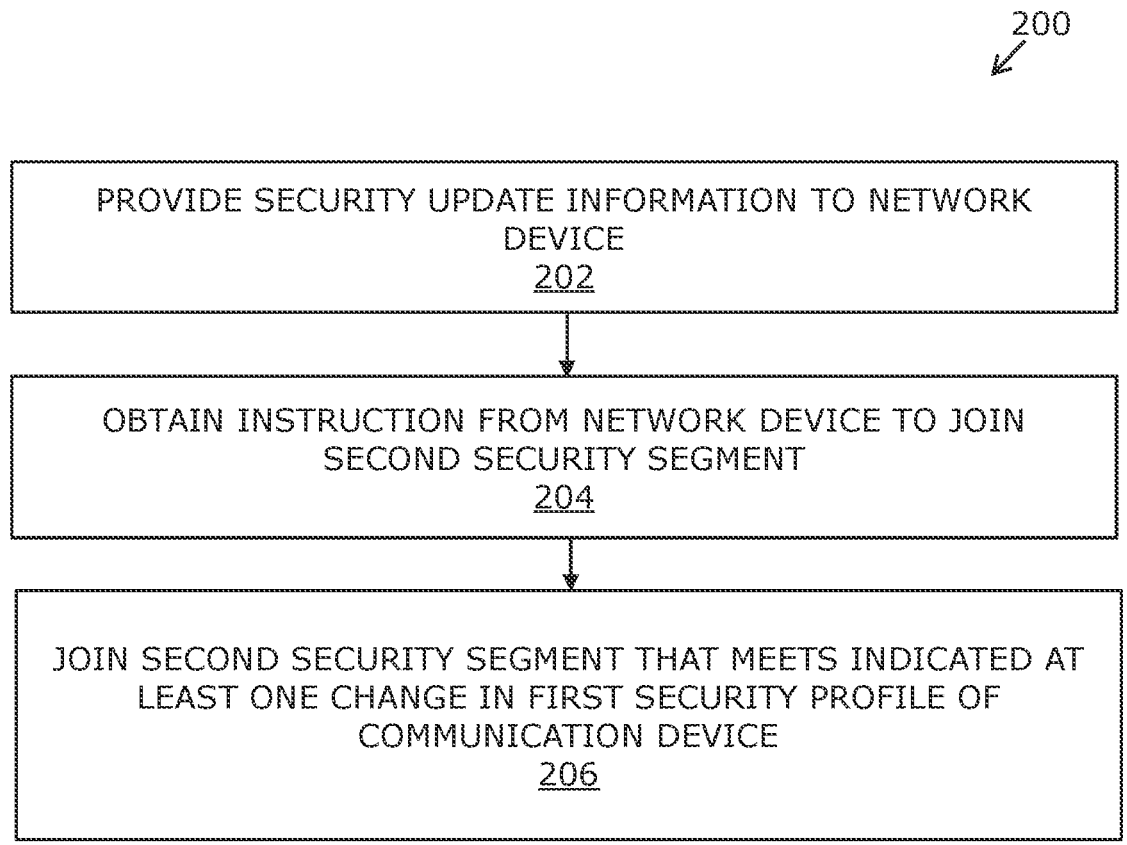
FIG. 2 is a flowchart of a method for executing a security negotiation for a network configuration at a communication device, in accordance with an embodiment of the present disclosure.

FIG. 2 is a flowchart of a method 200 for executing security negotiation for network configuration at a communication device, in accordance with an embodiment of the present disclosure. The method 200 is executed by a communication device described, for example, in FIG. 3A.

At step 202, a security update information is provided to a network device by the communication device. The communication device being assigned to a first security segment associated with a first segment security profile. As the security update information is proactively shared by the communication device with the network device, an active participation of the communication device is ensured in the decisions regarding association with a security segment of the communication device. The security update information is indicative of at least one change in a first security profile of the communication device. In accordance with an embodiment, the first security profile comprises one or more of: device properties, a device operational state, a network environment of the communication device, or a request to access one or more services at the communication device.

In accordance with an embodiment, the security update information is provided by the communication device to the network device based on a change in the device operational state of the communication device or a change in the network environment of the communication device. In accordance with an embodiment, the security update information corresponds to at least one of: the second security profile or one or more differences between the second security profile and the first security profile. The second security profile comprises one or more of: up-to-date device properties, a current device operational state, a last device operational state, an alternative network connectivity path used by the communication device, a request to access one or more services that are different from services supported by the first security segment, or a security event that defines dynamically changing information associated with the communication device. A message type indicator and the second security profile are used by the network device to determine the second security segment.

At step 204, an instruction is obtained by the communication device from the network device to join a second security segment. The security update information provided by the communication device enables the network device to be aware of any changes in network related functions and activities even if any network related communication bypasses a regular communication channel with the network device. Thus, the network device is able to determine an appropriate security segment (i.e. the second security segment in this case), and send a directive to the communication device to join the determined second security segment.

At step 206, the second security segment that meets the indicated at least one change in the first security profile of the communication device, is joined by the communication device based on the obtained instruction. The joining of the second security segment by the communication device enables to quickly and adequately close security gaps that may potentially arise due to such update or changes (e.g. changes in certain security attributes, services, or features) in the first security profile of the communication device.

In accordance with an embodiment, the joining of the second security segment comprises obtaining, by the communication device, from the network device, one or more of: a list of security services supported by the network device for the second security segment, a second segment security profile associated with the second security segment, or a plurality of segment security profiles for a plurality of security segments available with the network device. Alternatively stated, such information (such as the list of security services, the second segment security profile, and other available segment security profiles) obtained from the network device enables security negotiation and mutual security validation between the communication device and the network device. Both the network device and the communication device may execute security negotiation, where one party (e.g. the network device) specifies a list of available options to allow counterparty (e.g. the communication device) selection of a best matching option (i.e. a correct security segment), thereby reducing security segment mismatches, and improving overall network security and efficiency in network management.

In accordance with an embodiment, the joining of the second security segment further comprises validating, by the communication device, a decision related to the joining of the second security segment based on an assessment of the obtained second segment security profile associated with the second security segment. The communication device joins the second security segment if the validation is successful (i.e. the communication device and the network device mutually agree that the second security segment is a best match in accordance to the security update information. An enablement and disablement of one or more functions or services at the communication device is controlled in accordance with the obtained second segment security profile associated with the second security segment, if the validation is successful. For example, the communication device may disable firmware updates via a Wi-Fi network if the network device (e.g. a router) do not support a dedicated security segment for such function since the firmware update via a flat network (e.g. a network where all communication devices are connected via same network device) are considered insecure for the communication device.

In accordance with an embodiment, the method 200 further includes updating, by the communication device, the first security profile to a second security profile based on at least a change in a device operational state of the communication device or a change in a network environment of the communication device.

The steps 202, 204, and 206 are only illustrative and other alternatives can also be provided where one or more steps are added, one or more steps are removed, or one or more steps are provided in a different sequence without departing from the scope of the claims herein.

Figure 3A:
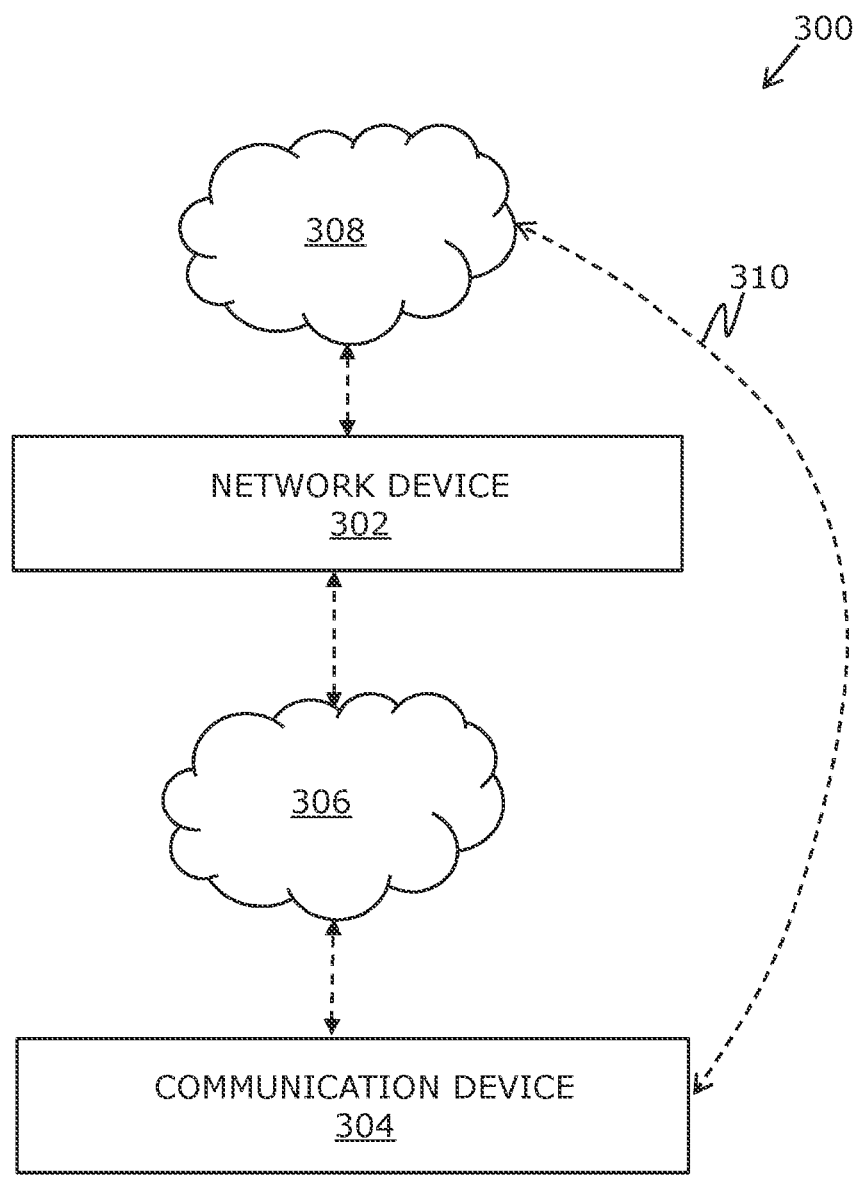
FIG. 3A is a network environment diagram of a system with a network device and a communication device, in accordance with an embodiment of the present disclosure.

FIG. 3A is a network environment diagram of a system 300 with a network device and a communication device, in accordance with an embodiment of the present disclosure. With reference to FIG. 3A, there is shown a network environment of the system 300 that includes a network device 302 and a communication device 304. There is further shown a first communication network 306, a second communication network 308, and an alternative network connectivity path 310.

The network device 302 refers to a networking hardware that acts as a gateway or a mediator between two networks, such as the first communication network 306 and the second communication network 308. For example, the communication device 304 may be communicatively coupled to the network device 302 via the first communication network 306 (e.g. a wireless local area network (WLAN)). The communication device 304 may access the second communication network 308 (e.g. the Internet) through the network device 302. The network device 302 includes a plurality of segment security profiles associated with a plurality of security segments. The plurality of security segments are different sections of a network (e.g. the first communication network 306) separated from other segments by the network device 302. The plurality of security segments may also be referred to as network segments that are formed after network segmentation. Network segmentation refers to splitting of a communication network into subnetworks, where each subnetwork is referred to as a security segment (a network segment). Examples of the network device 302 includes, but is not limited to a home gateway device, a router, a bridge router (i.e. a brouter), a network controller, a fixed wireless access (FWA) device, a server, a firewall device, or a network security device.

In an implementation, the network device 302 may include security negotiation specific application programming interfaces (APIs) that supports authentication and data ciphering to protect against potential network adversaries. The communication device 304 may also include such compatible APIs to support security negotiation with the network device 302. For example, requests and data to and from the communication device 304 and the network device 302 is potentially encrypted and optionally digitally signed to ensure confidentiality, integrity, and trustworthiness of the provided information.

The communication device 304 may include suitable logic, circuitry, interfaces and/or code that is configured to communicate with the network device 302 via the first communication network 306. Examples of the communication device 304 includes, but is not limited to a smart phone, an Internet-of-Things (IoT) device, a laptop device, a tablet device, a personal computer, a machine type communication (MTC) device, an evolved universal mobile telecommunications system (UMTS) terrestrial radio access (E-UTRAN) NR-dual connectivity (EN-DC) device, a server, an IoT controller, a drone, a hand-held computing device, a customized hardware for wireless telecommunication, or any other portable or non-portable electronic devices.

The first communication network 306 may include a medium through which one or more communication devices, such as the communication device 304 may communicate with the network device 302. Examples of the first communication network 306 may include, but are not limited to, a short range network (such as a home network), a 2-way radio frequency network (such as a Bluetooth-based network), a Wireless Personal Area Network (WPAN), and/or a WLAN, such as a Wireless Fidelity (Wi-Fi) network. Various communication devices, such as the communication device 304, may be configured to connect to the network device 302, in the first communication network 306, in accordance with various wired or wireless communication protocols. Examples of such wired or wireless communication protocols or technical standards may include, but are not limited to, International Organization for Standardization's (ISO) Technical Committee (TC) 16058, Bluetooth protocol, an infrared protocol, a Wireless Fidelity (Wi-Fi) protocol, a ZigBee protocol, IEEE 802.11, 802.16, cellular communication protocols, a Near Field Communication (NFC) protocol, a Universal Serial Bus (USB) protocol, and/or a wireless USB protocol.

In an example, the second communication network 308 may be different from the first communication network 306. The second communication network 308 may be accessed by one or more communication devices, such as the communication device 304, via the network device 302, which acts as a mediator or a gateway between the first communication network 306 and the second communication network 308. In some cases, the second communication network 308 may be directly accessed by one or more communication devices bypassing the network device 302 by use of the alternative network connectivity path 310. Examples of the second communication network 308 may include, but are not limited to, the Internet, a cloud network, a Local Area Network (LAN), a telephone line (POTS), a Metropolitan Area Network (MAN), a wireless sensor network (WSN), and/or a cellular network, such as a 3G, long-term evolution (LTE) 4G, or a 5G network. Various devices in the network environment may be configured to connect to the second communication network 308, in accordance with various wireless communication protocols. Examples of such wireless communication protocols, communication standards, and technologies may include, but are not limited to, IEEE 802.11, 802.11p, 802.15, 802.16, 1609, Worldwide Interoperability for Microwave Access (WiMAX), Transmission Control Protocol and Internet Protocol (TCP/IP), User Datagram Protocol (UDP), Hypertext Transfer Protocol (HTTP), Long-term Evolution (LTE), File Transfer Protocol (FTP), Enhanced Data GSM Environment (EDGE), voice over Internet Protocol (VoIP), a protocol for email, instant messaging, and/or Short Message Service (SMS), and/or cellular communication protocols.

The alternative network connectivity path 310 refers to a communication channel (or a connectively path) to connect to a network (e.g. the second communication network 308) bypassing the network device 302. For example, the communication device 304 may be communicatively coupled to the network device 302 via a Wi-Fi network (e.g. the first communication network 306) and may access Internet (e.g. the second communication network 308) via the network device 302. In certain scenarios, the communication device 304 may directly access Internet via a cellular network bypassing the regular communication channel (e.g. the Wi-Fi network). Thus, the cellular network corresponds to the alternative network connectivity path 310 in this case.

In accordance with an embodiment, the communication device 304 includes a first security profile (i.e. a device security profile). The first security profile comprises one or more of: device properties, a device operational state, a network environment of the communication device 304, or a request to access one or more services at the communication device 304. The first security profile has a data structure that comprises a plurality of fields. Each field of the plurality of fields include a security attribute. In an example, the device properties define security attributes, such as a device type, a manufacturer name, a current access list of uniform resource locators (URLs), a list of protocols (e.g. IPV4 or IPV6) supported at the communication device 304, a list of open ports, a list of closed ports, a list of allowed control interfaces and content type to and from the communication device 304, and a security posture of the communication device 304. The term 'security posture' refers to a security status related to one or more software and hardware of the communication device 304. The security posture may indicate current controls and measures implemented at the communication device 304 to protect the communication device 304 and other devices, which communicates with the communication device 304. For example, the security posture of the communication device 304 may specify current configuration settings and permissions related to pre-installed applications and operating system at the communication device 304, a list of services running at the communication device 304, a list of services disabled at the communication device 304, data recovery configurations, enabled or disabled hardware components, and accessory components supported at the communication device 304.

In an example, the device operational state specifies an application state or a hardware state of the communication device 304 when in operation. For example, the device operational state may indicate that a local firewall application is currently functional and has up-to-date virus definitions. The network environment of the communication device 304 includes information related to current network connectivity path(s) used by the communication device 304. For example, if the data traffic to and from the communication device 304 is routed via the network device 302 via the first communication network 306 or the communication device 304 is accessing the second communication network 308 (e.g. Internet) directly via a cellular connectivity path (e.g. the alternative network connectivity path 310). In an example, the network environment of the communication device 304 may also indicate a communication pattern of the communication device 304. The request to access one or more services at the communication device 304 may include a list of services additionally requested by the communication device 304. The request to access one or more services may also include a list of services that needs to be disabled. For example, the request may specify a requirement to access a network resource (e.g. an access to a data server, an access to a new folder in the data server, an access to a new application in the data server or a different server (e.g. an application server), a specified type of access control rights (i.e. read, write, modify, or special rights) for a network drive or a folder in the network drive or a local drive of the communication device 304, and the like.

In accordance with an embodiment, the communication device 304 is in an unassigned state to a given security segment. In a case where the communication device 304 is in the unassigned state (i.e. not yet assigned to any security segment by the network device 302), a first-time joining operation is executed between the communication device 304 and the network device 302. In the first-time joining operation, the communication device 304 is configured to provide the first security profile to the network device 302 over a negotiation segment when the communication device 304 is in the unassigned state. As discussed above, the first security profile is indicative of device capabilities and security requirements of the communication device 304 in the unassigned state. In an example, the negotiation segment may refer to a network segment that supports security negotiation and is temporarily used by the network device 302 and the communication device 304 to communicate prior to an actual assignment (or allocation) of a security segment of a plurality of security segments.

In accordance with an embodiment, the network device 302 is configured to obtain the first security profile from the communication device 304 over the negotiation segment when the communication device 304 is in the unassigned state. The network device 302 is further configured to determine a first security segment from a plurality of security segments for assignment to the communication device 304 based on the obtained first security profile. The network device 302 is further configured to provide an instruction to the communication device 304 to join the first security segment. The instruction apprises the communication device 304 of the determined first security segment that is relevant to the device capabilities and the security requirements of the communication device 304.

The communication device 304 is further configured to obtain the instruction from the network device 302 to join the first security segment. The communication device 304 is further configured to obtain a first segment security profile associated with the first security segment. The first segment security profile is potentially used to asses and validate whether or not the first security segment is suitable in accordance to the first security profile that indicates the device capabilities and the security requirements of the communication device 304. Thus, an active participation of the communication device 304 is ensured in the decisions regarding association with the determined first security segment.

The communication device 304 is further configured to join the first security segment based on the obtained instruction. Thus, the communication device 304 is assigned to the first security segment based on the first-time joining operation between the communication device 304 and the network device 302. In certain scenarios, the device operational state of the communication device 304 or the network environment of the communication device 304, may change. In such scenarios, the communication device 304 is further configured to update the first security profile to a second security profile based on at least a change in the device operational state of the communication device 304 or the change in the network environment of the communication device 304. In accordance with an embodiment, the second security profile comprises one or more of: up-to-date device properties, a current device operational state, a last device operational state, an alternative network connectivity path used by the communication device 304, a request to access one or more services that are different from services supported in the first security segment assigned to the communication device 304, or a security event that defines dynamically changing information associated with the communication device 304. The dynamically changing information is potentially related to a change in an application state or a hardware state (e.g. a sudden disablement of a microphone or an activation of an in-built camera, if present) of the communication device.

In an example, the first security profile of the communication device 304 may be updated as a result of internal firewall application failure. In another example, the communication device 304 may be an IoT controller. Initially, the IoT controller may be communicating with peer IoT devices via the first communication network 306 (e.g. a Wi-Fi channel) via the network device 302. There may be a sudden change of a network connectivity path, where the IoT controller may begin communication with peer IoT devices and a cloud server directly via the second communication network 308 (e.g. a cellular network), thereby bypassing the first communication network 306 (i.e. the Wi-Fi channel). The first security profile may be updated to reflect this change so that such communication by the alternative network connectivity path 310 (i.e. the cellular network in this example) is discernible by the network device 302. In yet another example, the communication device 304 may be an IoT device. For the IoT device, at the time of secure provisioning, the IoT device usually needs to be disconnected from a Wi-Fi network (e.g. the first communication network 306). The first security profile may be updated to reflect such temporary need to disconnect. In the conventional systems and methods, such changes are not immediately reflected by network communication patterns, and thus a conventional network device is not aware of such changes. Moreover, conventional communication devices have a static security profile (i.e. a static device profile). In contrast to conventional systems and methods, the first security profile of the communication device 304 is dynamic, which can accommodate changes.

In response to the update of the first security profile to the second security profile, the communication device 304 is configured to communicate a request to the network device 302. The request may be an on-demand request for segment reallocation from the currently assigned first security segment to a new security segment that is suitable in accordance with at least a change in the first security profile (e.g. a change in the device operational state of the communication device 304 or the change in the network environment of the communication device 304). Optionally, the request is potentially communicated in the form of a message having a message type indicator that indicates that the request is the on-demand request for segment reallocation from the communication device 304.

The communication device 304 is configured to provide a security update information to the network device 304. The security update information is provided by the communication device 304 when the communication device 304 is still assigned to the first security segment, which is associated with a first segment security profile. The security update information is indicative of at least one change in the first security profile of the communication device 304. The network device 302 is configured to obtain the security update information from the communication device 304 assigned to the first security segment.

In accordance with an embodiment, the security update information corresponds to at least one of the second security profile or one or more differences between the second security profile and the first security profile. In an implementation, the entire second security profile is provided to the network device 302 over the negotiation segment. In other words, the second security profile is exposed (e.g. advertised or published as a manifest) so that the network device 302 can obtain the second security profile. In another implementation, optionally, only the latest changes or updates (i.e. the one or more differences between the second security profile and the first security profile) are provided (or exposed) as the security update information to the network device 302 in order to save network bandwidth, and improve network performance. In such implementation, the network device 302 may store a last received security profile (e.g. the first security profile) from the communication device 304, and thus may derive the second security profile using the received latest change(s). Alternatively, as the network device 302 already have the first segment security profile associated with the first security segment assigned to the communication device 304, the receipt of the one or more differences between the second security profile and the first security profile, is potentially sufficient to find a new security segment that satisfies the one or more differences (i.e. the latest change(s)) in addition to other features of the first segment security profile.

The network device 302 is further configured to determine a second security segment for the communication device 304 based on the security update information. The network device 302 is configured to compare security attributes associated with the indicated at least one change in the first security profile with corresponding security attributes associated with each of the plurality of segment security profiles associated with the plurality of security segments. The comparison is executed to find a best matching segment (i.e. the second security segment in this case) for the communication device 304 from among the plurality of security segments. In accordance with an embodiment, the network device 302 is configured to use both the message type indicator (which indicates, for example, the on-demand request for segment reallocation) and the second security profile for the determination of the second security segment.

The network device 302 is further configured to provide an instruction to the communication device 304 to join the determined second security segment. In accordance with an embodiment, the network device 302 is further configured to provide, to the communication device 304, a second segment security profile associated with the determined second security segment. The second segment security profile shared with the communication device enables the communication device 304 to validate the decision whether to join the second security segment or not, and thus an active participation of the communication device 304 is ensured in the decisions regarding association with the determined second security segment.

In accordance with an embodiment, alternatively, the communication device 304 is further configured to obtain (or retrieve) from the network device 302, a list of security services supported by the network device 302 for the second security segment, the second segment security profile associated with the second security segment, or a plurality of segment security profiles of the plurality of security segments available with the network device 302. Such information obtained from the network device 302 enables the communication device 302 to validate if the second security segment is suitable or not in accordance to the at least one change (i.e. the latest change(s)) in the first security profile. Alternatively stated, such information (such as the list of security services, the second segment security profile, and other available segment security profiles) obtained from the network device 302 enables security negotiation and mutual security validation between the communication device 304 and the network device 302. Alternatively stated, both the network device 302 and the communication device 304 may execute security negotiation, where one party (e.g. the network device 302) specifies a list of available options to allow counterparty (e.g. the communication device 304) selection of a best matching option (i.e. a correct security segment), thereby reducing security segment mismatches, and improving overall network security and efficiency in network management. Thus, in accordance with an embodiment, the communication device 304 is further configured to validate a decision related to the joining of the second security segment based on at least an assessment of the obtained second segment security profile associated with the second security segment.

The communication device 304 is further configured to join the second security segment that meets the indicated at least one change in the first security profile of the communication device, based on the obtained instruction. The communication device 304 joins the second security segment if the validation is successful (i.e. the communication device 304 along with the network device 302 mutually agree that the second security segment is a best match in accordance to the security update information). In accordance with an embodiment, the communication device 304 is further configured to control enablement and disablement of one or more functions or services at the communication device 304 in accordance with the obtained second segment security profile associated with the second security segment, if the validation is successful. The enablement and disablement of one or more functions or services at the communication device 304 is potentially executed after the validation is successful and the communication device 304 joins the second security segment. For example, the communication device 304 may disable firmware updates via the first communication network 306 (e.g. a Wi-Fi network) if the network device 302 (e.g. a router) doesn't support a dedicated security segment for such function since the firmware update via a flat network (e.g. the first communication network 306 where all communication devices are connected via same network device 302) are considered insecure for a given communication device, such as the communication device 304.

The network device 304 is further configured to apply a specific network policy associated with the second security segment for the communication device after the communication device joins the second security segment and leaves the first security segment. For example, the communication device 304 may be an IoT device. During pairing time, the IoT device may require to be connected to a mobile phone (another communication device) and a specified cloud URL only. Such requirements may be communicated to the network device 302 by the communication device 304 as the security update information. In response, the network device 302 may temporary attach the IoT device to a dedicated security segment (or assign the dedicated security segment) that supports provisioning of the IoT devices by the given cloud and a given mobile phone, and the dedicated security segment has a dedicated access policy (e.g. the specific network policy) associated therewith.

In accordance with an embodiment, both or either of the network device 302 or the communication device 304 may support a legacy mode and a security negotiation mode. In a case where a given network device (such as the network device 302) and a given communication device (such as the communication device 304) do not support the various operations of the network device 302 or the communication device 304 for security negotiation, as discussed above, in such cases, such devices may continue to operate in the legacy mode (i.e. as defined in existing systems and methods for network configuration). Further, in a case where the security negotiation, as described above, in the various operations of the network device 302 or the communication device 304 is supported, the given network device or the communication device may switch to the security negotiation mode. Alternatively stated, the disclosed network device 302 and the communication device 304 are backward compatible and supports assignment and joining to a given security segment based on its capability.

Figure 3B:
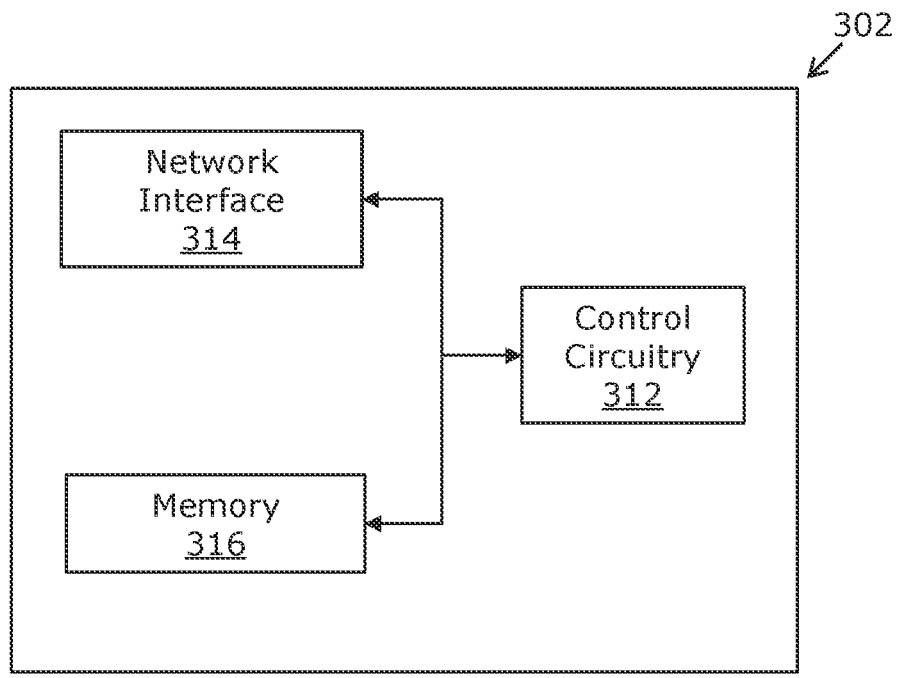
FIG. 3B is a block diagram that illustrates various exemplary components of a network device, in accordance with an embodiment of the present disclosure.
Figure 3C:
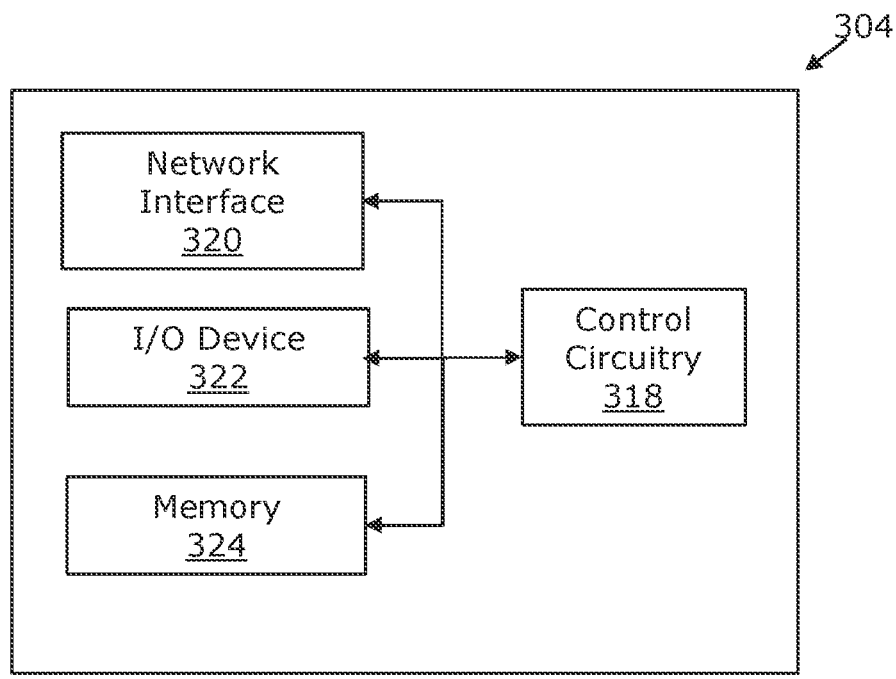
FIG. 3C is a block diagram that illustrates various exemplary components of a communication device, in accordance with an embodiment of the present disclosure.

FIG. 3B is a block diagram that illustrates various exemplary components of a network device, in accordance with an embodiment of the present disclosure. FIG. 3C is described in conjunction with elements from FIG. 3A. With reference to FIG. 3B, there is shown the network device 302. The network device 302 includes a control circuitry 312, a network interface 314, and a memory 316. The control circuitry 312 may be communicatively coupled to the network interface 314 and the memory 316.

The control circuitry 312 of the network device 302 is configured to obtain the security update information from the communication device 304. The security update information is indicative of at least one change in the first security profile of the communication device 304. In an implementation, the control circuitry 312 may be a general-purpose processor. In an implementation, the control circuitry 312 is configured to execute instructions stored in the memory 316. Examples of the control circuitry 312 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. Moreover, the control circuitry 312 may refer to one or more individual processors, processing devices, a processing unit that is part of a machine.

The network interface 314 may include suitable logic, circuitry, and/or interfaces that may be configured to communicate with one or more external devices, such as the network device 302 or peer communication devices. Examples of the network interface 314 may include, but is not limited to, a radio frequency (RF) transceiver, an antenna, a telematics unit, one or more amplifiers, one or more oscillators, a digital signal processor, a coder-decoder (CODEC) chipset, and/or a subscriber identity module (SIM) card. The network interface 314 may wirelessly communicate by use of various wired or wireless communication protocols.

The memory 316 may include suitable logic, circuitry, and/or interfaces that may be configured to store machine code and/or instructions with at least one code section executable by the control circuitry 312. The memory 316 may store the plurality of segment security profiles. Examples of implementation of the memory 316 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. The memory 316 may store an operating system and/or other program products to operate the network device 402. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

FIG. 3C is a block diagram that illustrates various exemplary components of a communication device, in accordance with an embodiment of the present disclosure. FIG. 3C is described in conjunction with elements from FIGS. 1, 2, 3A, and 3B. With reference to FIG. 3C, there is shown the communication device 304. The communication device 304 includes a control circuitry 318, a network interface 320, an input/output (I/O) device 322, and a memory 324. The control circuitry 318 may be communicatively coupled to the network interface 320, the I/O device 322, and the memory 324.

The control circuitry 318 of the communication device 304 is configured to provide the security update information to the network device 302. In an implementation, the control circuitry 318 is configured to execute instructions stored in the memory 324. Examples of the control circuitry 318 is similar to that of the control circuitry 312 (FIG. 3B). Similarly, examples of implementation of the network interface 320 and the memory 324 is similar to that of the network interface 314 and the memory 316, respectively of FIG. 3B.

The I/O device 322 refers to input and output devices that can receive input from a user and provide output to the user. The I/O device 322 may be communicatively coupled to the control circuitry 318. Examples of input devices may include, but are not limited to, a touch screen, such as a touch screen of a display device, a microphone, a motion sensor, a light sensor, a dedicated hardware input unit (such as a push button or a keyboard), and a docking station. Examples of output devices include a display device and a speaker. Examples of the display device include, but is not limited to a display screen, a smart-glass display, a projection-based display, a virtual reality-based display, or other display screen.

Figure 4:
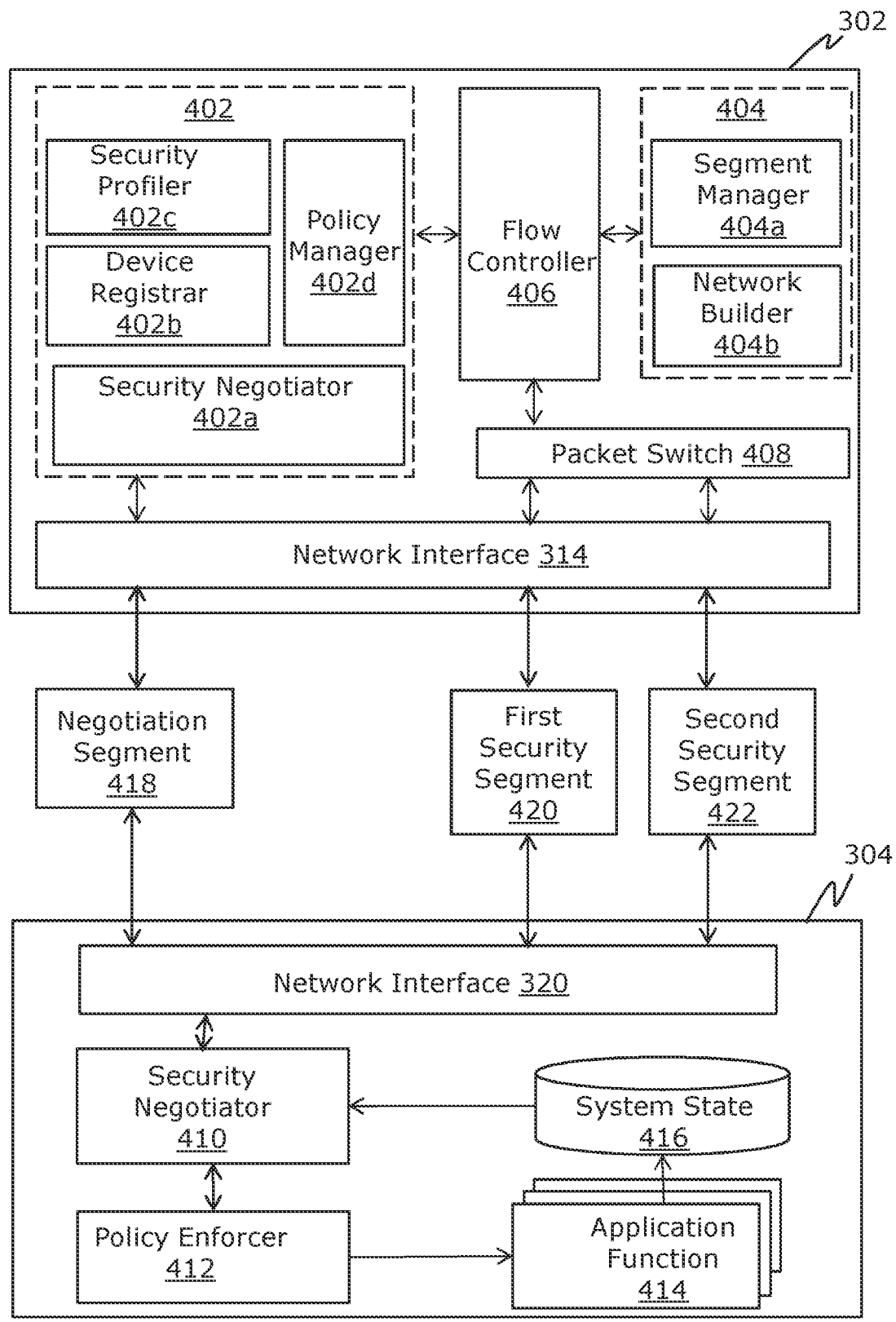
FIG. 4 is a diagram that illustrates exemplary communication between a network device and a communication device for execution of a security negotiation for a network configuration, in accordance with an embodiment of the present disclosure.

FIG. 4 is a diagram that illustrates various exemplary functional components of a network device and a communication device for execution of a security negotiation for a network configuration, in accordance with an embodiment of the present disclosure. FIG. 4 is described in conjunction with elements from FIGS. 1, 2, and 3A to 3C. With reference to FIG. 4, there is shown the network device 302 and the communication device 304. There is further shown a security negotiation section 402, a security segment management section 404, a flow controller 406, a packet switch 408, and the network interface 314 in the network device 302. The security negotiation section 402 includes a security negotiator 402a, a device registrar 402b, a security profiler 402c, and a policy manager 402d. There is further shown a security negotiator 410, a policy enforcer 412, an application function 414, a system state 416, and the network interface 320 in the communication device 304. There is also shown a negotiation segment 418, a first security segment 420, and a second security segment 422.

The various exemplary functional components of the network device 302 and the communication device 304 may be implemented as software modules, hardware modules, or a combination of software and hardware elements (e.g. executable code, logic, interfaces, or circuits). In an implementation, the operations or functions performed by such functional components (such as the security negotiation section 402, the security segment management section 404, the flow controller 406, and the packet switch 408) of the network device 302 may be centrally managed and operated under the control of the control circuitry 312 (FIG. 3B) of the network device 302. In another implementation, all the functions or operations of the various functional components of the network device 302 may be performed by the control circuitry 312 of the network device 302. Similarly, the various functional components (such as the security negotiator 410, the policy enforcer 412, the application function 414, and the system state 416) of the communication device 304 may be operated under the control of the control circuitry 318 (FIG. 3C) of the communication device 304.

The security negotiation section 402 of the network device 302 supports security negotiation with a plurality of communication devices, such as the communication device 304. The security negotiation section 402 is configured to communicate with the plurality of communication devices, such as the communication device 304, over the negotiation segment 418. The security negotiation section 402 includes the security negotiator 402a.

The security negotiator 402a is configured to obtain (or sense) information (e.g. via the network interface 314) related to each of the plurality of communication devices, such as the communication device 304, which are communicatively coupled to the network device 302. The security negotiator 402a is further configured to provide the sensed information (i.e. information obtained from the communication device 304) to other functional components, such as the device registrar 402b, the security profiler 402c, the policy manager 402d, the flow controller 406, and the packet switch 408, for determination of a given security segment from the plurality of security segments that is suitable for the communication device 304. In an example, the security negotiator 402a is further configured to utilise information retrieved from a plurality of specified application programming interfaces (APIs) (e.g. open device APIs), use application layer protocols (e.g. simple network management protocol (SNMP)), specified cloud services (e.g. manufacturer usage description (MUD) specification) and/or use the analysis of communications by the communication device 304, in order to determine a correct security segment (e.g. the first security segment or the second security segment) for the communication device 304. Beneficially, the security negotiator 402a supports various functions, such as provisioning to the plurality of communication devices, such as the communication device 304 (or advertising or publishing on network), a list of security services supported by the network device 302, and the plurality of segment security profiles of the plurality of security segments available with the network device 302. The security negotiator 402a further serves requests related to an information request, a segment reallocation request, a segment profile sharing request, or profile update request, and the like, when received from the plurality of communication devices, such as the communication device 304.

In an example, the device registrar 402b may be a database in which a list of communication devices registered at the network device 302 is maintained. For example, a current list of communication devices that have already joined a given security segment from the plurality of security segments, may be registered in the device registrar 402b. Optionally, the device registrar 402b may also maintain historical data (e.g. timestamps and corresponding device identifiers) related to joining and leaving of a particular security segment by a communication device of the plurality of communication devices, such as the communication device 304.

The security profiler 402c is configured to compare security attributes associated a given security profile of a communication device (such as the communication device 304) with corresponding security attributes associated with each of a plurality of segment security profiles associated with a plurality of security segments. The security profiler 402c is communicatively coupled to the segment manager 404a via the flow controller 406.

The policy manager 402d is configured to manage different network policies associated with different security segments. Moreover, the policy manager 402d is configured to apply a specific network policy associated with a given security segment for a given communication device (such as the communication device 304) after the communication device joins the given security segment.

The security segment management section 404 supports management of the plurality of segment security profiles of the plurality of security segments at the network device 302. The security segment management section 404 includes the segment manager 404a, and the network builder 404b. The segment manager 404a is potentially responsible for creation and management of the plurality of segment security profiles, and further sharing of such segment security profiles in accordance with requests received from the plurality of communication devices (such as the communication device 304).

The flow controller 406 is responsible for managing flow of information and instructions to- and from the network device 302 for the first-time joining operation and the on-demand segment reallocation requests received from the plurality of communication devices (such as the communication device 304).

The packet switch 408 enables transmission of data between the network device 302 and each of the plurality of communication devices (such as the communication device 304) in a form of data packets over an allocated security segment (such as the first security segment 420 or the second security segment 422). Each data packet may include various details, such as a source IP address, destination IP address and unique data, and packet identifiers. Once the communication device 304 joins the second security segment 422 and leaves the first security segment 420, the packet switch 408 is configured to switch data traffic and related communication exclusively over the second security segment 422.

The security negotiator 410 of the communication device 304 supports a security negotiation with the network device 302, for example, over the negotiation segment 418. Beneficially, the security negotiator 410 supports various functions, such as providing the first security profile (i.e. a device security profile) to the network device 302 (or advertising or publishing on a network so that network device 302 can obtain the published first security profile). The security negotiator 410 is configured to communicate various requests, such as the information request, the segment reallocation request, the segment profile sharing request, or the profile update request, to the network device 302. The security negotiator 410 updates the network device 302 if there is any change in security requirements (e.g. the security update information that indicates the latest changes in the first security profile) of the communication device 304. The security negotiator 410 is further configured to retrieve the list of security services supported by the network device 302, a segment security profile of a new security segment (e.g. the second security segment 422) assigned to the communication device 304, or and the plurality of segment security profiles of the plurality of security segments available with the network device 302. The security negotiator 410 ensures an active participation of the communication device 304 in the decisions regarding association with a given security segment that is determined (or allocated) by the network device 302. The security negotiator 410 is configured to notify the policy enforcer 412 to execute local policy enforcement function with suggested functionality adjustment in accordance with a segment security profile of a security segment (such as the first security segment 420 or the second security segment 422) joined by the communication device 304.

The policy enforcer 412 is responsible for enablement and disablement of one or more functions or services at the communication device 304 in accordance with a segment security profile of a security segment (such as the first security segment 420 or the second security segment 422) joined by the communication device 304.

The application function 414 is configured to detect a change in an application state of one or more applications, operating systems and associated data, or a hardware state of the communication device 304. For example, any change in the device operational state of the communication device 304 or the change in the network environment of the communication device 304 that potentially affects security of the communication device 304, is detected. Such detected change(s) are notified to the system state 416.

The system state 416 may refer to a logger (or a database) that records such change(s) detected and notified by the application function 414. The first security profile is updated to the second security profile based on one or more changes the device operational state or the network environment of the communication device 304. The security negotiator 410 then updates the network device 302 of such change(s) in security requirements as the security update information that indicates the latest changes in the first security profile of the communication device 304.

Figure 5:
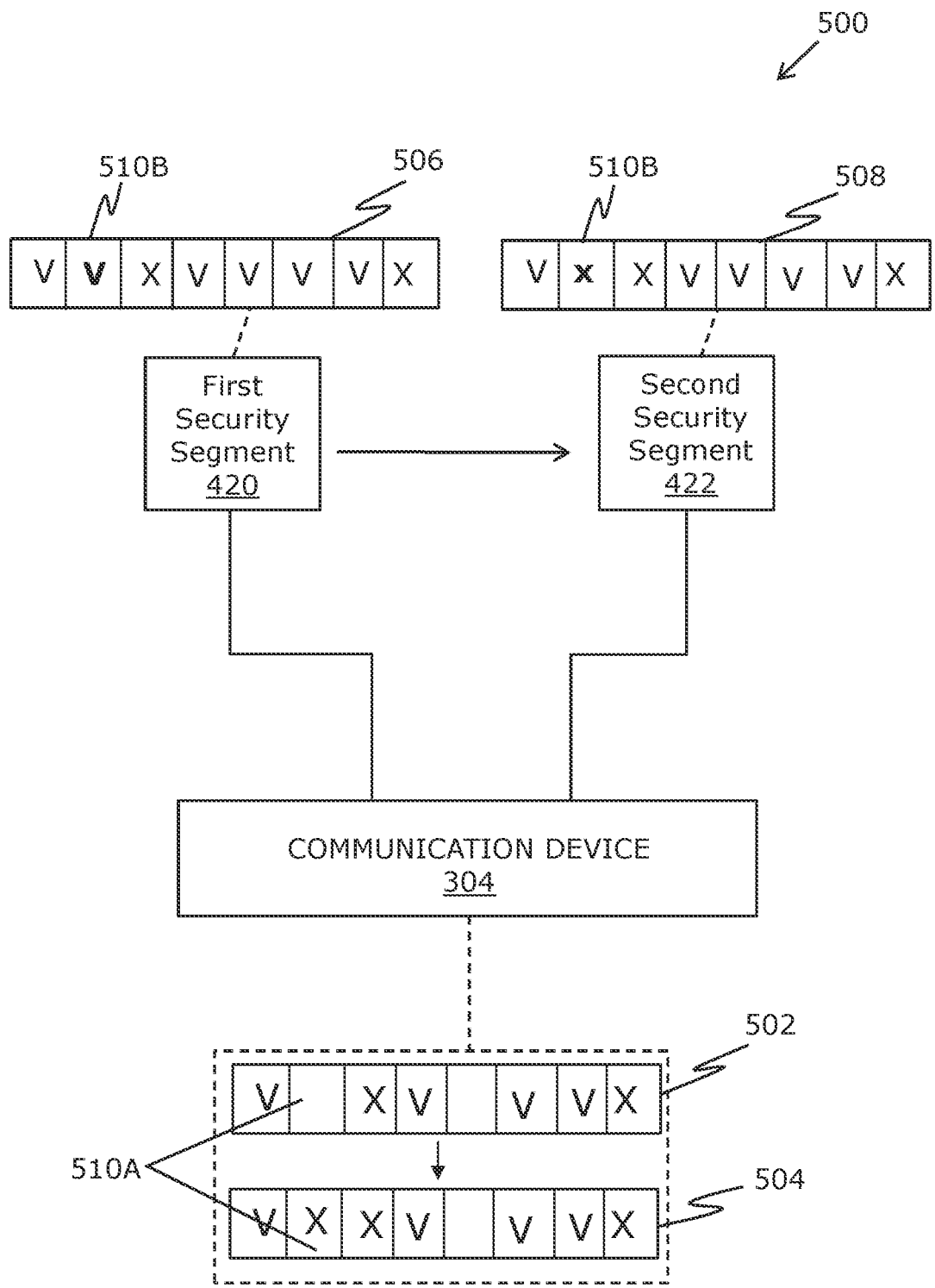
FIG. 5 is an illustration of an exemplary scenario that depicts a working principle of security negotiation for a network configuration, in accordance with an embodiment of the present disclosure.

FIG. 5 is an illustration of an exemplary scenario 500 that depicts a working principle of security negotiation for network configuration, in accordance with an embodiment of the present disclosure. FIG. 5 is described in conjunction with elements from FIGS. 1, 2, 3A to 3C, and 4. With reference to FIG. 5, there is shown the exemplary scenario 500 that depicts a first security profile 502 and a second security profile 504 of the communication device 304. There is further shown a first segment security profile 504 and a second segment security profile 506 of the network device 302 (FIG. 3A). There is also shown the first security segment 420 and the second security segment 422.

In accordance with the exemplary scenario 500, profile definitions of various security profiles (such as the first security profile 502, the second security profile 504, the first segment security profile 504, and the second segment security profile 506) are represented by vectors of functions (e.g. features, services, or a security requirement), where "V" indicates "must be supported", "X" indicates "must be disabled", and a blank box indicates a neutral stance where any state is okay.

As shown, the communication device 304 may include the first security profile 502 that indicates a first device operational state of the communication device 304. As shown, in the first security profile 502, there are a plurality of slots that includes either "V", a blank box, or "X". The communication device 304 having the first security profile 502 in the first device operational state is assigned to the first security segment 420. The first security segment 420 is associated with the first segment security profile 504 that is suitable for the communication device 304 in accordance with the first security profile 502 of the communication device 304. For example, the slot 510A in the first security profile 502 is the blank box that do not establish any security requirement for a given feature (e.g. FTP upload to a given URL) of the slot 510A. Thus, the communication device 304 is adequately secured when joined to the first security segment 422 associated with the first segment security profile 504, in which the given feature (e.g. FTP upload to the given URL) is allowed and supported (denoted by "V" in the corresponding slot 510B). However, a device operational state of the communication device 304 may change from the first device operational state to a second device operational state. The first security profile 502 is then updated to the second security profile 504 to reflect the change in the device operational state. For example, a new requirement may be related to "backup of user credentials", and thus, the given feature in the slot 510A in the second security profile 504 may start to collide (i.e. conflict) with the corresponding slot 510B of the first segment security profile 504. The new requirement is that given feature (or function) must be disabled for the backup period (e.g. during FTP upload to the given URL). The communication device 304 is configured to communicate a request for reallocation of a security segment to the network device 302. The communication device 304 further provides the second security profile 504 to the network device 302 along with the request after profile collision is detected (and before an actual backup is started at the communication device 304 using the given URL). In response to the received request and the second security profile 504, the network device 302 is configured to determine the second security segment 422 as a best match that meets the new requirement (i.e. the latest change). For example, the second segment security profile 506 associated with the second security segment 422 has the given feature disabled (e.g. "backup of user credentials" is disabled for the backup period) at the slot 510B. Thus, in this case, the security is hardened when the communication device joins the second security segment 422.

Figure 6:
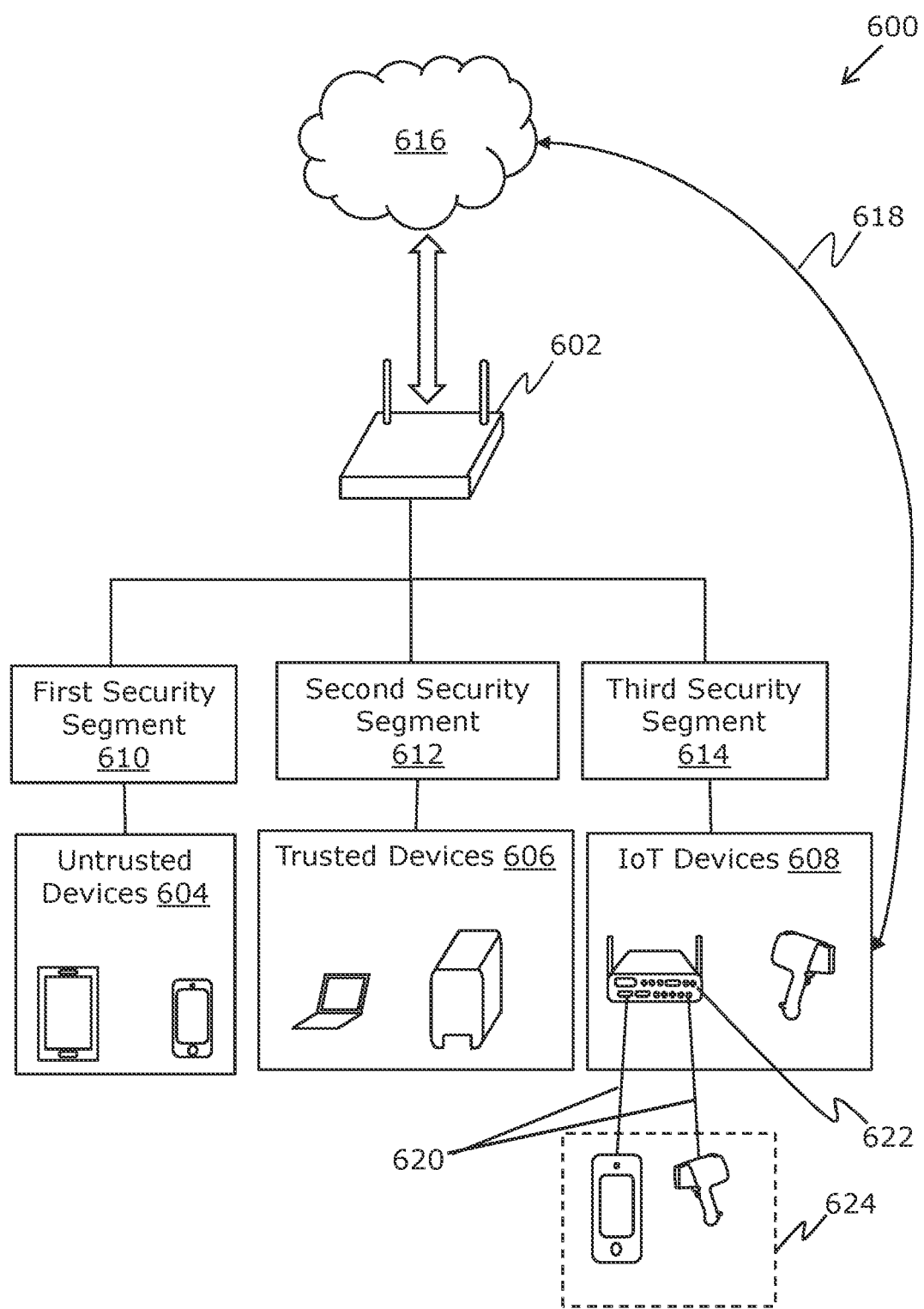
FIG. 6 is an illustration of an exemplary scenario that depicts execution of security negotiation for network configuration for different communication devices, in accordance with an embodiment of the present disclosure.

FIG. 6 is an illustration of an exemplary scenario 600 that depicts execution of a security negotiation for a network configuration for different communication devices, in accordance with an embodiment of the present disclosure. FIG. 6 is described in conjunction with elements from FIGS. 1, 2, 3A to 3C, 4, and 5. With reference to FIG. 6, there is shown the exemplary scenario 600 that includes a gateway device 602, a set of untrusted devices 604, a set of trusted devices 606, and a set of IoT devices 608. There is further shown a first security segment 610, a second security segment 612, and a third security segment 614, a communication network 616, an alternative network connectivity path 618, and a set of network connections 620 from an IoT controller 622 in the set of IoT devices 608 to peer IoT devices.

In accordance with the exemplary scenario 600, the gateway device 602 corresponds to the network device 302 (FIG. 3A). Each of the set of untrusted devices 604, the set of trusted devices 606, and the set of IoT devices 608 corresponds to the communication device 304 (FIG. 3A). Each of the set of untrusted devices 604, the set of trusted devices 606, and the set of IoT devices 608 may be directly connected to the gateway device 602 via a W-Fi network, and may access the network resources of the communication network 616 (e.g. the Internet) through the gateway device 602. Certain IoT devices, such as the IoT devices 624, may not be directly connected to the gateway device 602, and may be communicatively coupled to another IoT device, such as the IoT controller 622 via the set of network connections 620.

Typically, in conventional systems and methods, communications via the set of network connections 620 between the IoT controller 622 and the IoT devices 624, may be invisible to a conventional gateway device. In other words, the conventional gateway device may not be aware of such communications, which may have adverse security implications. Moreover, certain IoT devices, such as the IoT controller 622 may bypass the gateway device 602, and directly access the communication network 616 (i.e. the Internet) by use of the alternative network connectivity path 618 (e.g. a cellular network). In conventional systems and methods, the conventional gateway device may also be not aware of such communications undertaken via the alternative network connectivity path 618, which may have adverse security implications. In contradiction to conventional systems and methods, the disclosed methods and devices (such as the gateway device 602) captures such unexposed communications using a security profile (e.g. the first security profile) of each communication device (e.g. each of the set of untrusted devices 604, the set of trusted devices 606, and the set of IoT devices 608a has its own security profile, referred to as the first security profile). Such first security profile provided by each of the set of untrusted devices 604, the set of trusted devices 606, and the set of IoT devices 608, enables enhanced assessment of the security capabilities and security requirements of individual devices by the gateway device 602. For example, certain security features (or security posture) of each communication device that may otherwise remain undetected (i.e. unexposed) via a regular Wi-Fi communication channel (e.g. using auto-discoverable function) by the gateway device 602, is easily and accurately detected by use of the first security profile. Thus, the first security profile enables the gateway device 602 to determine a best matching security segment from among the plurality of security segments for assignment to corresponding communication devices, thereby providing adequate security. For example, the set of untrusted devices 604 may be guest devices (e.g. having unknown device type, unsupported manufacturer, or devices of unknown vendor which may behave unpredictably), which may be assigned a dedicated security segment, such as the first security segment 610, in which security is comparatively more hardened (i.e. restricted access) as compared to the set of trusted devices 606. Similarly, based on the obtained first security profile from each communication devices, the gateway device 602 is further configured to determine the second security segment 612 for the set of trusted devices 606, and the third security segment 614 for the set of IoT devices 608. In cases where there is a change in a device operational state or the network environment of one or more communication devices (such as one or more of the set of untrusted devices 604, the set of trusted devices 606, and the set of IoT devices 608), security update information corresponding to such communication devices is proactively provided to the gateway device 602. Such communication device originated updates (i.e. the security update information) enables active participation of each connected communication device in the decisions regarding association with a security segment. As the security update information is proactively shared by each communication device, the gateway device 602 is able to determine a correct security segment that fulfils the latest change in the first security profile of corresponding communication devices in real time or near real time. Thus, the chances of security segment mismatch are significantly reduced, thereby reducing the risk of security breaches in each participating communication device and improving overall network security and efficiency in network management.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the disclosure, which are, for brevity, described in the context of a single embodiment, may also be provided separately or in any suitable combination or as suitable in any other described embodiment of the disclosure.

What is claimed is:

1. A method for executing a security negotiation for a network configuration at a network device, the method comprising:
   obtaining, by the network device, a security update information from a communication device being assigned to a first security segment, the first security segment being associated with a first segment security profile, wherein the security update information is indicative of at least one change in a first security profile of the communication device,
   determining, by the network device, a second security segment for the communication device based on the security update information; and
   providing, by the network device, an instruction to the communication device to join the determined second security segment.

2. The method according to claim 1, further comprising providing, by the network device, to the communication device, a second segment security profile associated with the determined second security segment, wherein the second segment security profile is used by the communication device to: validate a decision to join the second security segment; and control, based on the validation, enablement and disablement of one or more functions or services at the communication device in accordance with the second segment security profile.

3. The method according to claim 1, wherein the obtaining of the security update information by the network device is based on one of a change in a device operational state of the communication device or a change in a network environment of the communication device.

4. The method according to claim 1, wherein the determining of the second security segment for the communication device comprises comparing security attributes associated with the indicated at least one change in the first security profile with corresponding security attributes associated with each of a plurality of segment security profiles associated with a plurality of security segments.

5. The method according to claim 1, further comprising applying a network policy associated with the second security segment for the communication device after the communication device joins the second security segment and leaves the first security segment.

6. The method according to claim 1, wherein the first security profile comprises one or more of: device properties, a device operational state, a network environment of the communication device, or a request to access one or more services at the communication device, and wherein the first security profile is updated by the communication device to a second security profile based on at least a change in a device operational state of the communication device or a change in a network environment of the communication device.

7. The method according to claim 6, wherein the security update information corresponds to at least one of: the second security profile or one or more differences between the second security profile and the first security profile, and wherein the second security profile comprises one or more of: up-to-date device properties, a current device operational state, a last device operational state, an alternative network connectivity path used by the communication device, a request to access one or more services that are different from services supported in the first security segment assigned to the communication device, or a security event that defines dynamically changing information associated with the communication device.

8. The method according to claim 7, wherein the determining of the second security segment for the communication device comprises using a message type indicator and the second security profile.

9. The method according to claim 1, wherein the communication device is assigned to the first security segment based on a first-time joining operation between the network device and the communication device, and wherein the first-time joining operation comprises:
obtaining, by the network device, the first security profile from the communication device over a negotiation segment when the communication device is in an unassigned state to a given security segment, and wherein the first security profile is indicative of device capabilities and security requirements of the communication device in the unassigned state;
determining, by the network device, the first security segment from a plurality of security segments for assignment to the communication device based on the obtained first security profile; and
providing an instruction to the communication device to join the first security segment, wherein the instruction apprises the communication device of the determined first security segment that is relevant to the device capabilities and the security requirements of the communication device.

10. A method for executing a security negotiation for a network configuration at a communication device, the method comprising:
providing, by the communication device, a security update information to a network device, the communication device being assigned to a first security segment associated with a first segment security profile, wherein the security update information is indicative of at least one change in a first security profile of the communication device;
obtaining, by the communication device, an instruction from the network device to join a second security segment; and
joining, by the communication device, the second security segment that meets the indicated at least one change in the first security profile of the communication device, based on the obtained instruction.

11. The method according to claim 10, wherein the security update information is provided by the communication device to the network device based on a change in a device operational state of the communication device or a change in a network environment of the communication device.

12. The method according to claim 10, wherein the first security profile comprises one or more of: device properties, a device operational state, a network environment of the communication device, or a request to access one or more services at the communication device.

13. The method according to claim 10, further comprising updating, by the communication device, the first security profile to a second security profile based on at least a change in a device operational state of the communication device or a change in a network environment of the communication device.

14. The method according to claim 13, wherein the security update information corresponds to at least one of: the second security profile or one or more differences between the second security profile and the first security profile, and wherein the second security profile comprises one or more of: up-to-date device properties, a current device operational state, a last device operational state, an alternative network connectivity path used by the communication device, a request to access one or more services that are different from services supported by the first security segment, or a security event that defines dynamically changing information associated with the communication device, and wherein a message type indicator and the second security profile are used by the network device to determine the second security segment for the communication device.

15. The method according to claim 10, wherein the joining of the second security segment comprises obtaining, by the communication device, from the network device, one or more of: a list of security services supported by the network device for the second security segment, a second segment security profile associated with the second security segment, or a plurality of segment security profiles of a plurality of security segments available with the network device.

16. The method according to claim 15, wherein the joining of the second security segment further comprises:
validating, by the communication device, a decision related to the joining of the second security segment based on an assessment of the obtained second segment security profile associated with the second security segment; and
controlling, by the communication device, enablement and disablement of one or more functions or services at the communication device in accordance with the obtained second segment security profile associated with the second security segment, when the validation is successful.

17. The method according to claim 10, wherein the communication device is assigned to the first security segment based on a first-time joining operation between the communication device and the network device, and wherein the first-time joining operation comprises:
providing, by the communication device, the first security profile to the network device over a negotiation segment when the communication device is in an unassigned state to a given security segment, wherein the first security profile is indicative of device capabilities and security requirements of the communication device in the unassigned state;

obtaining, by the communication device, an instruction from the network device to join the first security segment; and joining, by the communication device, the first security segment based on the obtained instruction.

18. A network device for executing a security negotiation for a network configuration, comprising:

a control circuitry that is configured to:

obtain a security update information from a communication device being assigned to a first security segment, the first security segment being associated with a first segment security profile, wherein the security update information is indicative of at least one change in a first security profile of the communication device;

determine a second security segment for the communication device based on the security update information; and provide an instruction to the communication device to join the determined second security segment.

19. A communication device for executing a security negotiation for a network configuration, comprising:

a control circuitry that is configured to:

provide a security update information to a network device from the communication device being assigned to a first security segment, the first security segment being associated with a first segment security profile, wherein the security update information is indicative of at least one change in a first security profile of the communication device;

obtain an instruction from the network device to join a second security segment; and join the second security segment that meets the indicated at least one change in the first security profile of the communication device, based on the obtained instruction.

* * * * *